United States Patent
Childress et al.

(10) Patent No.: US 8,181,173 B2
(45) Date of Patent: May 15, 2012

(54) DETERMINING PRIORITY FOR INSTALLING A PATCH INTO MULTIPLE PATCH RECIPIENTS OF A NETWORK

(75) Inventors: Rhonda L. Childress, Austin, TX (US); Itzhack Goldberg, Hadera (IL); David Bruce Kumhyr, Austin, TX (US); Stephen James Watt, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 1172 days.

(21) Appl. No.: 11/871,243

(22) Filed: Oct. 12, 2007

(65) Prior Publication Data

US 2009/0100419 A1    Apr. 16, 2009

(51) Int. Cl.
*G06F 9/44*    (2006.01)

(52) U.S. Cl. ........ 717/171; 717/174; 717/177; 717/178; 709/203; 709/223; 709/230

(58) Field of Classification Search .......... None
See application file for complete search history.

(56) References Cited

U.S. PATENT DOCUMENTS

| | | | |
|---|---|---|---|
| 5,884,020 A | 3/1999 | Portch et al. | |
| 6,012,152 A | 1/2000 | Douik et al. | |
| 6,609,127 B1 | 8/2003 | Lee et al. | |
| 6,615,166 B1 * | 9/2003 | Guheen et al. | 703/27 |
| 6,826,581 B2 | 11/2004 | Moslander et al. | |
| 6,901,346 B2 | 5/2005 | Tracy et al. | |
| 6,990,660 B2 | 1/2006 | Moshir et al. | |
| 7,000,247 B2 | 2/2006 | Banzhof | |
| 7,089,548 B2 | 8/2006 | Lin | |
| 7,165,250 B2 * | 1/2007 | Lyons | 717/177 |
| 7,584,467 B2 * | 9/2009 | Wickham et al. | 717/171 |
| 7,680,880 B2 * | 3/2010 | Landfield | 709/203 |
| 7,703,091 B1 * | 4/2010 | Martin et al. | 717/174 |
| 7,735,078 B1 * | 6/2010 | Vaidya | 717/171 |
| 7,814,481 B1 * | 10/2010 | Welder et al. | 717/176 |
| 7,853,708 B2 * | 12/2010 | Townsley et al. | 709/230 |

(Continued)

OTHER PUBLICATIONS

David Botta et al. "Towards Understanding IT Security Professionals and Their Tools", [Online], Jul. 2007, pp. 100-111, [Retrieved on Dec. 27, 2011], [Retrieved from Internet], <http://delivery.acm.org/10.1145/1290000/1280693/p100-botta.pdf>.*

(Continued)

*Primary Examiner* — Thuy Dao
*Assistant Examiner* — Ziaul A Chowdhury
(74) *Attorney, Agent, or Firm* — Yee & Associates, P.C.; Mark C. Vallone

(57) ABSTRACT

A method, computer program product, and system are disclosed for installing a patch on at least some of the servers of a network having multiple servers. A plurality of servers of the network are identified that requires installation of the patch. Two or more priority values are assigned to each of the identified servers. The priority values for a given identified server are each associated with a different criterion in a set of criteria. The assigned priority values are selectively processed for respective identified servers, in order to determine an initial priority, comprising a first sort order, for installing the patch on each identified server. The first sort order is revised in accordance with information pertaining to prior use of respective identified servers, to provide a second sort order. The patch is installed on each of the identified servers, in an order determined by the second sort order.

20 Claims, 7 Drawing Sheets

U.S. PATENT DOCUMENTS

| | | | |
|---|---|---|---|
| 2002/0087757 A1* | 7/2002 | Wagner | 710/54 |
| 2002/0147645 A1 | 10/2002 | Alao et al. | |
| 2003/0130887 A1* | 7/2003 | Nathaniel | 705/14 |
| 2003/0221190 A1* | 11/2003 | Deshpande et al. | 717/171 |
| 2003/0225867 A1* | 12/2003 | Wedlake | 709/222 |
| 2004/0002880 A1* | 1/2004 | Jones | 705/7 |
| 2004/0044999 A1* | 3/2004 | Gibson | 717/178 |
| 2004/0111505 A1* | 6/2004 | Callahan et al. | 709/223 |
| 2004/0167906 A1* | 8/2004 | Smith et al. | 707/100 |
| 2005/0015760 A1 | 1/2005 | Ivanov et al. | |
| 2005/0065837 A1* | 3/2005 | Kosiba et al. | 705/9 |
| 2005/0097547 A1* | 5/2005 | Ramachandran et al. | 717/177 |
| 2006/0031371 A1* | 2/2006 | Uthe | 709/207 |
| 2006/0031420 A1* | 2/2006 | Ferguson et al. | 709/219 |
| 2006/0101457 A1* | 5/2006 | Zweifel et al. | 717/174 |

OTHER PUBLICATIONS

Cheng-Wei Dai et I. "Data Transfer Over the Internet for Real Time Applications" [Online], 2006, pp. 414-424, [Retrieved from Internet], [Retrieved on Dec. 28, 2011],<http://www.springerlink.com/content/5331314400740232/fulltext.pdf>.*

Anna Smears, "Information Security Management Systems in Small & Medium Sized Enterprises", [Online], 2003,pp. 1-15, [Retrieved on Dec. 28, 2011], [Retrieved from Internet], <http://citeseerx.ist.psu.edu/viewdoc/download?doi=10.1.1.195.2215&rep=rep1&type=pdf>.*

Linda Briesemeister et al. "Detection, Correlation, and Visualization of Attacks Against Critical Infrastructure Systems" [Online], 2010, pp. 1-8, [Retrieved on Dec. 28, 2011], [Retrieved from Internet], < http://www.csl.sri.com/users/linda/bibs/publications/pst2010.pdf>.*

Novak, "VA Scanners Pinpoint Your Weak Spots" Jun. 26, 2003, Security Review, pp. 1-9 http://www.networkcomputing.com/article/printFullArticleSrc.jhtml?articleID=15000643.

"Files repository", UpdSoftware: Upd, pp. 1-2, retrieved Sep. 18, 2007 http://www.filesrepository.com/software/upd.html.

* cited by examiner

| 500 ↘ | | | | | |
|---|---|---|---|---|---|
| 502 | 504 | 506 | 508 | 510 | |
| SERVER | PRIORITY SORT 1 | PRIORITY SORT 2 | PRIORITY SORT 3 | PRIORITY SORT n | |
| A | 3 | 5 | 1 | | |
| B | 1 | 5 | 5 | | |
| C | 1 | 1 | 3 | | |
| D | 5 | 5 | 5 | | |
| E | 3 | 5 | 3 | | |
| F | 1 | 3 | 1 | | |
| G | 5 | 1 | 3 | | |
| H | 5 | 5 | 5 | | |
| I | 1 | 3 | 1 | | |
| J | 3 | 1 | 1 | | |
| K | 3 | 3 | 1 | | |
| L | 1 | 3 | 3 | | |

FIG. 5A

| 500 ↘ | | | | | |
|---|---|---|---|---|---|
| 502 | 504 | 506 | 508 | 510 | |
| SERVER | PRIORITY SORT 1 | PRIORITY SORT 2 | PRIORITY SORT 3 | PRIORITY SORT n | |
| D | 5 | 5 | 5 | | |
| G | 5 | 1 | 3 | | |
| H | 5 | 5 | 5 | | |
| A | 3 | 5 | 1 | | |
| E | 3 | 5 | 3 | | |
| J | 3 | 1 | 1 | | |
| K | 3 | 3 | 1 | | |
| B | 1 | 5 | 5 | | |
| C | 1 | 1 | 3 | | |
| F | 1 | 3 | 1 | | |
| I | 1 | 3 | 1 | | |
| L | 1 | 3 | 3 | | |

FIG. 5B

| SERVER | PRIORITY SORT 1 | PRIORITY SORT 2 | PRIORITY SORT 3 | PRIORITY SORT n |
|---|---|---|---|---|
| D | 5 | 5 | 5 | |
| H | 5 | 5 | 5 | |
| G | 5 | 1 | 3 | |
| A | 3 | 5 | 1 | |
| E | 3 | 5 | 3 | |
| K | 3 | 3 | 1 | |
| J | 3 | 1 | 1 | |
| B | 1 | 5 | 5 | |
| F | 1 | 3 | 1 | |
| I | 1 | 3 | 3 | |
| L | 1 | 3 | 1 | |
| C | 1 | 1 | 3 | |

FIG. 5C

| SERVER | PRIORITY SORT 1 | PRIORITY SORT 2 | PRIORITY SORT 3 | PRIORITY SORT n |
|---|---|---|---|---|
| D | 5 | 5 | 5 | |
| H | 5 | 5 | 5 | |
| G | 5 | 1 | 3 | |
| E | 3 | 5 | 3 | |
| A | 3 | 5 | 1 | |
| K | 3 | 3 | 1 | |
| J | 3 | 1 | 1 | |
| B | 1 | 5 | 5 | |
| L | 1 | 3 | 3 | |
| F | 1 | 3 | 1 | |
| I | 1 | 3 | 1 | |
| C | 1 | 1 | 3 | |

FIG. 5D

DETERMINING PRIORITY FOR INSTALLING A PATCH INTO MULTIPLE PATCH RECIPIENTS OF A NETWORK

BACKGROUND OF THE INVENTION

1. Field of the Invention

The invention disclosed and claimed herein is generally directed to a method for determining the order or priority in which a patch is to be installed into different servers or other patch recipients of a network, wherein the patch cannot be installed simultaneously into all servers that need it. More particularly, the invention pertains to a method of the above type wherein a range of criteria are used to determine the order or priority of installation. Even more particularly, the invention pertains to a method of the above type wherein the criteria includes information indicating the probability that respective servers will or will not be used within a time frame related to the time required for all patch installations to be completed.

2. Description of the Related Art

As is known by those of skill in the art, a patch used in computing is a small piece of software designed to update or fix problems with a computer program or its supporting data. A patch is used to fix bugs, replace graphics and improve usability or performance. Though meant to fix problems, poorly designed patches can sometimes introduce new problems. Patch management is generally the process of using a strategy and plan to decide which patches should be applied to which systems at a particular time.

It is increasingly common to use patches in order to deal with security threats to network computer systems. In large enterprise networks and outsource data centers, which can comprise systems having large numbers of servers, it is likely that a patch cannot be installed at the same time on all the servers that need it. Accordingly, there will be a delay in getting the patch into some of the servers, while it is being installed in others. At present, different approaches are used to determine the order in which the patch is to be provided to the servers of different systems of a network. In one arrangement, the patching effort pushes patches down through a hierarchy of gateways (a top down node type of distribution). In another arrangement, a patch is applied to servers according to a list, which may or may not be current. Alternatively, the list can be built dynamically, if the user understands what conditions are to be checked for, and pertinent information is available.

It is to be emphasized that in a network of the above type, the order in which different servers receive the patch can be very important. As an example, a LAN network having a large number of servers at respective work stations could be threatened by a virus or worm, wherein some of the work stations were directly connected to access the Internet, whereas other work stations were remote from the Internet. If a decision was made to install a patch to overcome the worm or virus on the remote workstations first, and leave the directly connected workstations until later, the virus may be able to enter the network through the directly connected workstations, before those stations could be patched to stop the virus.

In addition to patches provided for security reasons, there may also be other reasons for applying patches to system servers of a network in an expedited fashion. For example, a patch may be used to enhance the data integrity of system servers, or may improve the performance thereof. However, any sort of emergency patch or fix, whether for security or non-security purposes, generally does not undergo sufficient regression tests before installation. Accordingly, in determining the order or priority in which a patch is to be applied to the servers of a network, such application should be limited only to the servers that truly have an immediate need for the patch.

For example, usage history of a particular server, if available, could show that the server is used only at the beginning of each calendar quarter, and that use for the current quarter has just occurred. As a result, this server should be given low priority in a project to install a patch on network servers of the associated network, particularly if the entire project will be completed within a month. However, server usage histories are generally not considered, in common approaches for sequentially installing a patch into different servers of a network or system.

The task of prioritizing network servers to receive patches can also be affected by policies that have been put in place by the business or other entity that owns or controls the network. Such policies tend to prioritize patching by considering which servers have the highest use, the highest value, and/or the highest vulnerability. However, different organizations or entities typically have patch prioritization policies that can be quite different from one another. It is thus necessary, in determining the priority in which a patch is to be installed into the system servers of a particular entity network, to take pertinent policies of such entity into account.

SUMMARY OF THE INVENTION

In a method for determining the priority for installing a patch into different servers of a network, data indicating the use of each server over a period of time is tracked and stored. This data can then be used to analyze the relative importance of applying a patch to a particular server during a particular time frame. Embodiments are also configured to establish patch priorities for a network that are influenced by pertinent policies of the business or other organization that controls the network. In one embodiment of the invention, a computer implemented method is provided for installing a patch on at least some of the servers of a network having multiple servers. The method comprises the steps of identifying a plurality of servers of the network that each requires installation of the patch, and assigning two or more priority values to each of the identified servers. The priority values for a given identified server are each associated with a different criterion in a set of criteria. The method further comprises selectively processing the assigned priority values for respective identified servers, in order to determine an initial priority, comprising a first sort order, for installing the patch on each identified server. The first sort order is revised in accordance with information pertaining to prior use of respective identified servers, to provide a second sort order. The patch is installed on each of the identified servers, in an order determined at least in part by the second sort order. As an option, one or more additional sort orders can be provided for use in determining the order for installing the patch.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5A-D are charts that further illustrate teachings of the flowchart of FIG. 4.

DETAILED DESCRIPTION OF THE PREFERRED EMBODIMENT

Figure 1:
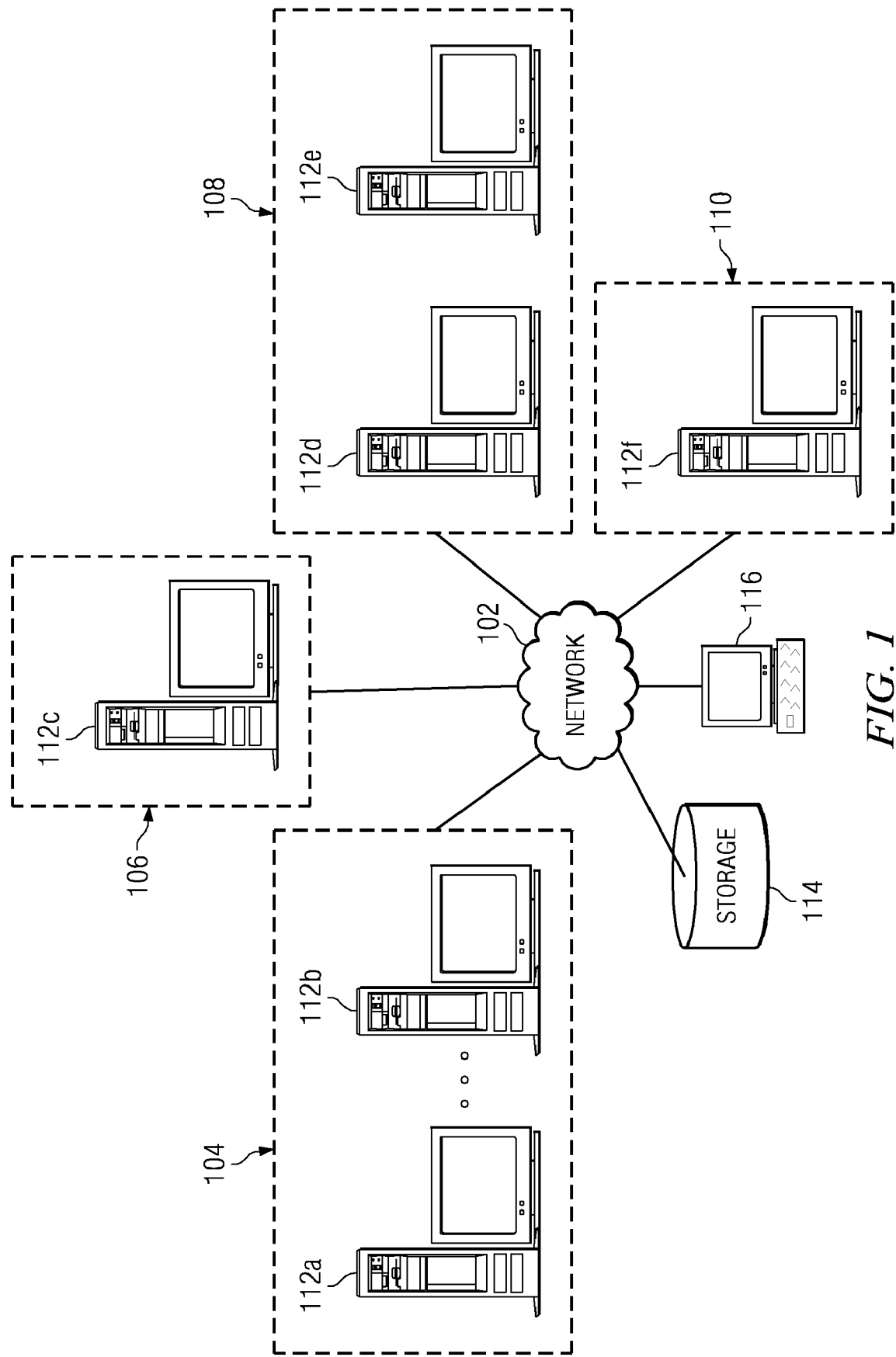
FIG. 1 is a block diagram showing a network that comprises multiple data processing systems, each having one or more servers, for use in illustrating an embodiment of the invention.

Referring to FIG. 1, there is shown a network 102 comprising multiple data processing systems, exemplified in FIG. 1 by systems 104-110. Each of the systems 104-110 includes at least one of the servers 112*a-f*. Each of the systems 104 and 108 contains two or more servers, such as 112*a-b* and 112*d-e*, respectively, and possibly contains large groups or clusters thereof.

If it becomes necessary to install a software patch as defined above in one or more of the servers of systems 104-110, the order, sequence or priority in which systems and servers thereof respectively receive the patch must be determined. As described above, the priority that the servers of each system are given in patch installation can be very important, in order to avoid delay in placing the patch into the systems that need it the most. On the other hand, servers of a system can be given low priority, upon determining that rapid installation of the patch is not needed for such systems.

Referring further to FIG. 1, there is shown a computer system 116 connected to network 102 that is configured to implement an embodiment of the invention. More particularly, computer 116 is disposed to determine the order or priority for installing a specified patch on the servers 112*a-f* of respective systems 104-110, wherein the priority is based on a number of different criteria, as described hereinafter. In support of the embodiment, data which indicates the use of each server 112*a-f* over a specified period of time is monitored and stored in a database 114, connected to network 102. Such data can be used later, in order to generate patterns of use for respective servers, that indicate how important it is to provide a patch therefor during a particular time frame.

Figure 2:
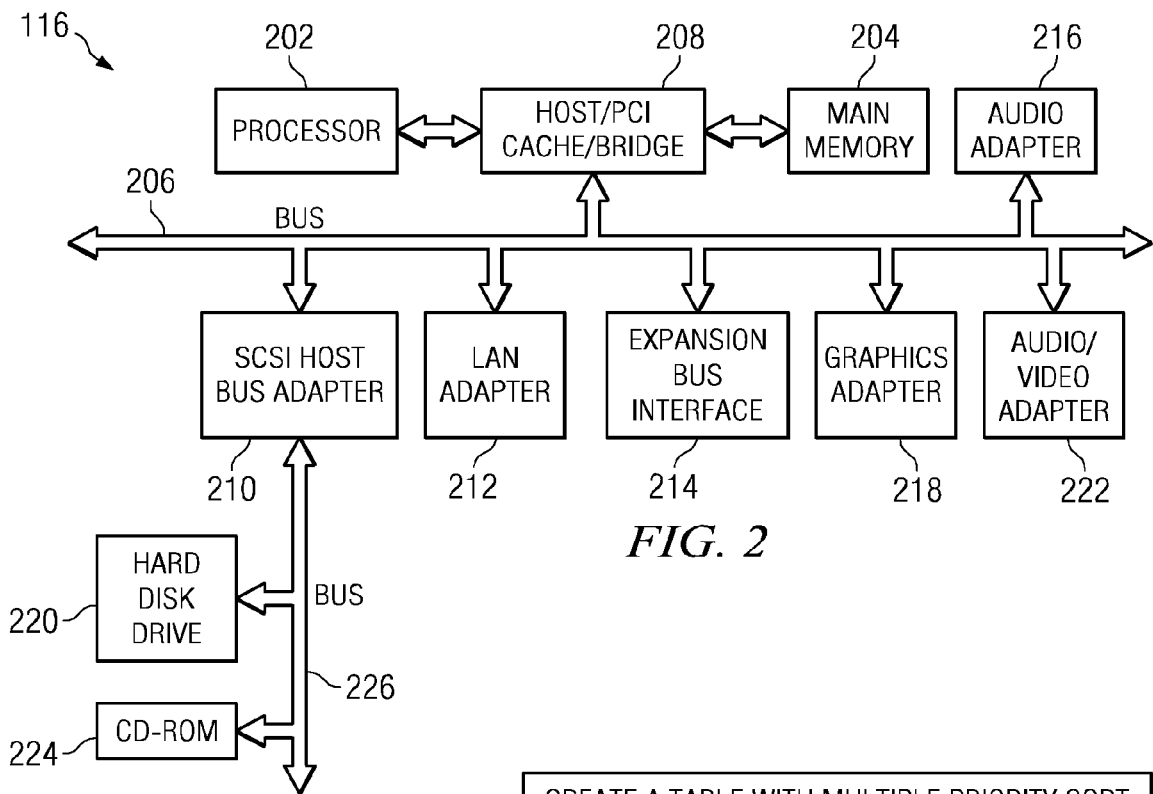
FIG. 2 is a block diagram showing a computer or data processing system, which may be used in connection with the network of FIG. 1 to implement an embodiment of the invention.

Referring to FIG. 2, there is shown a block diagram depicting a computer or data processing system that may be used as the computer 116, and is configured for use in implementing an embodiment of the present invention. Computer system 116 exemplifies a computer, in which code or instructions for implementing the processes of the present invention may be located. Computer system 116 usefully employs a peripheral component interconnect (PCI) local bus architecture, although other bus architectures alternatively are used. FIG. 2 shows a processor 202 and main memory 204 connected to a local bus 206 through a Host/PCI bridge 208. PCI bridge 208 also may include an integrated memory controller and cache memory for processor 202.

Referring further to FIG. 2, there is shown a local area network (LAN) adapter 212, a small computer system interface (SCSI) host bus adapter 210, and an expansion bus interface 214 respectively connected to PCI local bus 206 by direct component connection. Audio adapter 216, a graphics adapter 218, and audio/video adapter 222 are connected to PCI local bus 206 by means of add-in boards inserted into expansion slots. SCSI host bus adapter 210 provides a connection for hard disk drive 220, and also for CD-ROM drive 224 through bus 226.

An operating system runs on processor 202 and is used to coordinate and provide control of various components within computer system 116 shown in FIG. 2. The operating system may be a commercially available operating system such as Windows XP, which is available from Microsoft Corporation. Instructions for the operating system devices, such as hard disk drive 220, may be loaded into main memory 204 for execution by processor 202.

Figure 3:
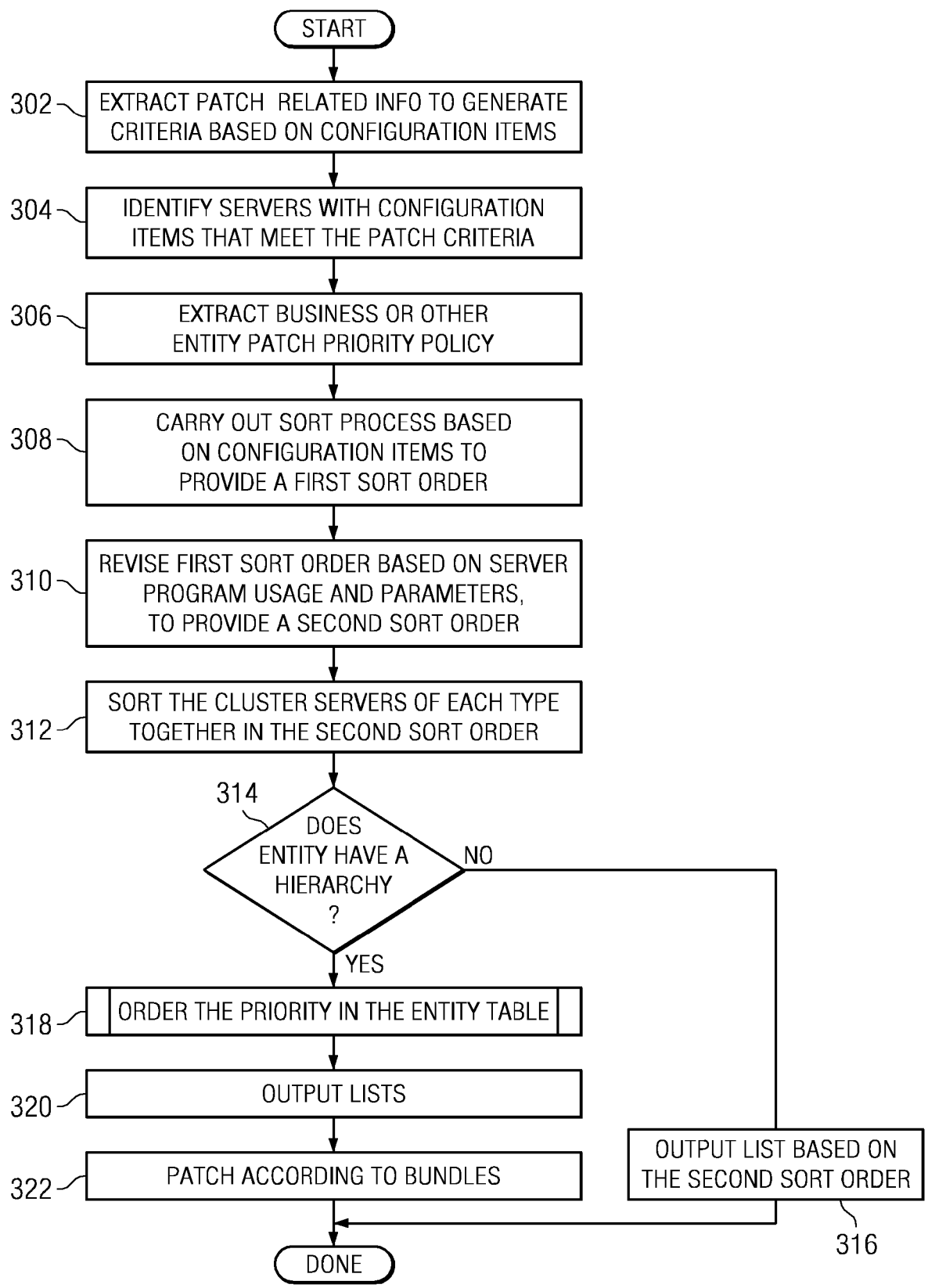
FIG. 3 is a flowchart showing principal steps for an embodiment of the invention.

Referring to FIG. 3, a method or process comprising an embodiment of the invention commences upon recognizing that a patch is required for software of at least some of the servers, or other components, of a network such as network 102. Such other components could include, for example, firewalls or the like. Herein, servers and all other components for which a patch is required are referred to generically as "patch recipients". Usefully, embodiments of the invention provide a system and method that uses business or other entity rules, together with a logic engine to prioritize patch installation.

At step 302 of FIG. 3, patch information related to a particular patch, as well as to configuration items or attributes of the servers that must receive the patch, is extracted or acquired. Information pertaining to the patch includes the type of patch, that is, whether it is a security patch, is for improving data integrity or performance, or has another purpose. The configuration items (CI) may include, for example, particular software in the servers, the server operating system, or structural attributes such as whether or not a particular server faces the Internet. In a useful arrangement, the patch and CI related information would be furnished by the patch vendor or developer.

Usefully, the patch and configuration item information are used to determine whether a particular system needs a patch, or is exempt therefrom. Moreover, as described hereinafter in further detail, the patch and configuration item information is used to generate criteria for determining the order or priority in which respective servers that need the patch will receive it. In accordance with embodiments of the invention, it has been recognized that multiple criteria, based on different configuration items or attributes of the identified servers, are very advantageously used in determining priority.

At step 304 of FIG. 3, all the servers of the network that require the patch are identified, based on the criteria developed at step 302. For example, the criteria, in addition to those referred to above, could specify all servers that use a specific version of a certain operating system, since the patch only applies to such version and operating system. Other servers of the network would not need to be considered further.

At step 306, it is necessary to extract the patch priority policy, if there is one, of the business or other entity that owns the network 102. The business impact of a patch is controlled by this entity. Thus, in determining priority for installing patches in respective servers, the effect of pertinent entity policy must be considered. An example of such policy, for a company A, is set forth below. The example shows patch type, a weight value for each type of patch, and indicates that the security patch was inherited and cannot be overridden.

| Company A | | | |
|---|---|---|---|
| Patch Type | Weight | Inherited | Override? |
| security | 10 | Yes | No |
| Severity 1 bug fix | 8 | | |
| Data integrity | 7 | | |
| Severity 2 bug fix | 5 | | |
| Performance | 4 | | |
| Severity 3 bug fix | 3 | | |
| General patch bundle | 1 | | |

After all the servers that require the patch have been identified, the order or priority in which respective servers are to receive the patch must be determined. At step 308, a sorting process is carried out, in regard to priority values that are assigned to each identified server based on its configuration items or attributes. This process generates an initial priority, or, first sort order, as defined hereinafter in connection with FIG. 4 and FIGS. 5A-D.

Figure 4:
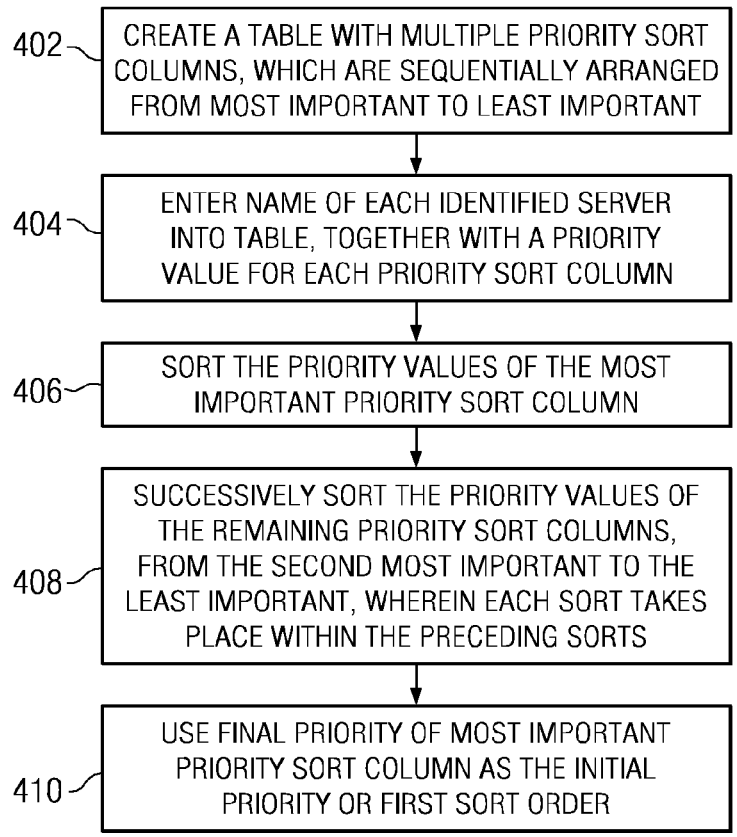
FIG. 4 is a flowchart corresponding to one of the steps in the flowchart of FIG. 3.

Referring to FIG. 4, there is shown a flowchart depicting steps of a process for providing the first sort order. At step 402, a table is created that has multiple priority sort columns, wherein each column comprises a linear array containing multiple data elements. Each priority sort column corresponds to a different type of criterion, configuration item or attribute of the identified servers, wherein each such configuration item has some relationship to installation of the patch. Such configuration items could include, for example, whether a server is or is not Internet facing, the type of operating system the server has, and different software programs or components that the server may contain.

The priority sort columns are sequentially arranged, from most important to least important. Moreover, each priority sort column is associated with a sequence of priority values, which are assigned to the identified servers on the basis of their corresponding configuration items. At step 404, the name of each identified server is entered into the table, together with the priority values that the server has for the respective priority sort columns.

Referring to FIG. 5A, there is shown a table 500 for FIG. 4 having columns 502-510, each containing data entries pertaining to the identified servers. Column 502 contains the names of respective servers A-L in an arbitrary order, such as the order in which they are listed in an inventory. Columns 504-510 are priority sort columns as defined above, wherein column 504 (Priority Sort 1) corresponds to the most important configuration item, and is thus the most important criterion in determining priority for patch installation. Columns 506 and 508, or Priority Sort 2 and Priority Sort 3 respectively, pertain to successively less important configuration items. Column 510, or Priority Sort n, indicates that an unspecified additional number of configuration items may be selected to provide further criteria in determining priority for patch installation.

By way of example, a server that faces the Internet, or is directly connected thereto, may be very vulnerable to a virus or the like. Accordingly, the configuration item or attribute of Priority Sort 1 is selected to be the relationship that each server has with the Internet. If a server faces the Internet, it is given the highest priority value of 5. A server that is intermediate to the Internet is given a priority value of 3, and a server that is inaccessible to the Internet has a priority value of 1. Only three priority values are used, for simplicity of illustration.

The columns of Priority Sort 2 and 3 of FIG. 5A could be associated with different software programs, which perform different functions in the network 102. Priority Sort 2 pertains to data integrity, and servers A-L are each given a priority value for this function, on the basis of the patch priority policy of the owner of network 102. Each server is given a priority value of 5, 3 or 1, to indicate that it has great, medium or little effect, respectively, on data integrity. Priority Sort 3 pertains to performance, and each server is similarly given a priority value of 5; 3; or 1.

In accordance with step 406 of FIG. 4, it is necessary to first sort respective priority values of Priority Sort 1. This results in the arrangement of table 500 shown by FIG. 5B. Therein, servers D, G and H have been moved to the top of the column of Priority Sort 1, with servers A, E, J and K being the next group down. The sorting procedure may use a bubble sort method, although the invention is not limited thereto.

Thereafter, in accordance with step 408, Priority Sort 2 is sorted within Priority Sort 1, to provide the arrangement of FIG. 5C. This sort results in server H being moved above server G in the order of priority, server K being moved above server J, and server C being moved below all other servers. Finally, Priority Sort 3 (where n=0) is sorted within Priority Sort 2, whereby server E is moved above server A, and server L is moved above servers F and I. This is shown by FIG. 4D. As indicated by step 410 of FIG. 4, the priority sequence shown by column 504 of FIG. 5D becomes the first sort order, or initial priority, provided by step 308 of FIG. 3. In this sequence, server D has the highest priority for installation of the patch, and server C has the lowest priority.

FIG. 3 further shows that the first sort order is revised at step 310, based on anticipated usage of the server programs that would be affected by the patch. Step 310 recognizes that in determining priority for installing the patch, it is important to consider how soon respective servers will be used or needed. The process of step 310 is described hereinafter in further detail, in connection with FIG. 6, and provides a revised second sort order.

Figure 6A:
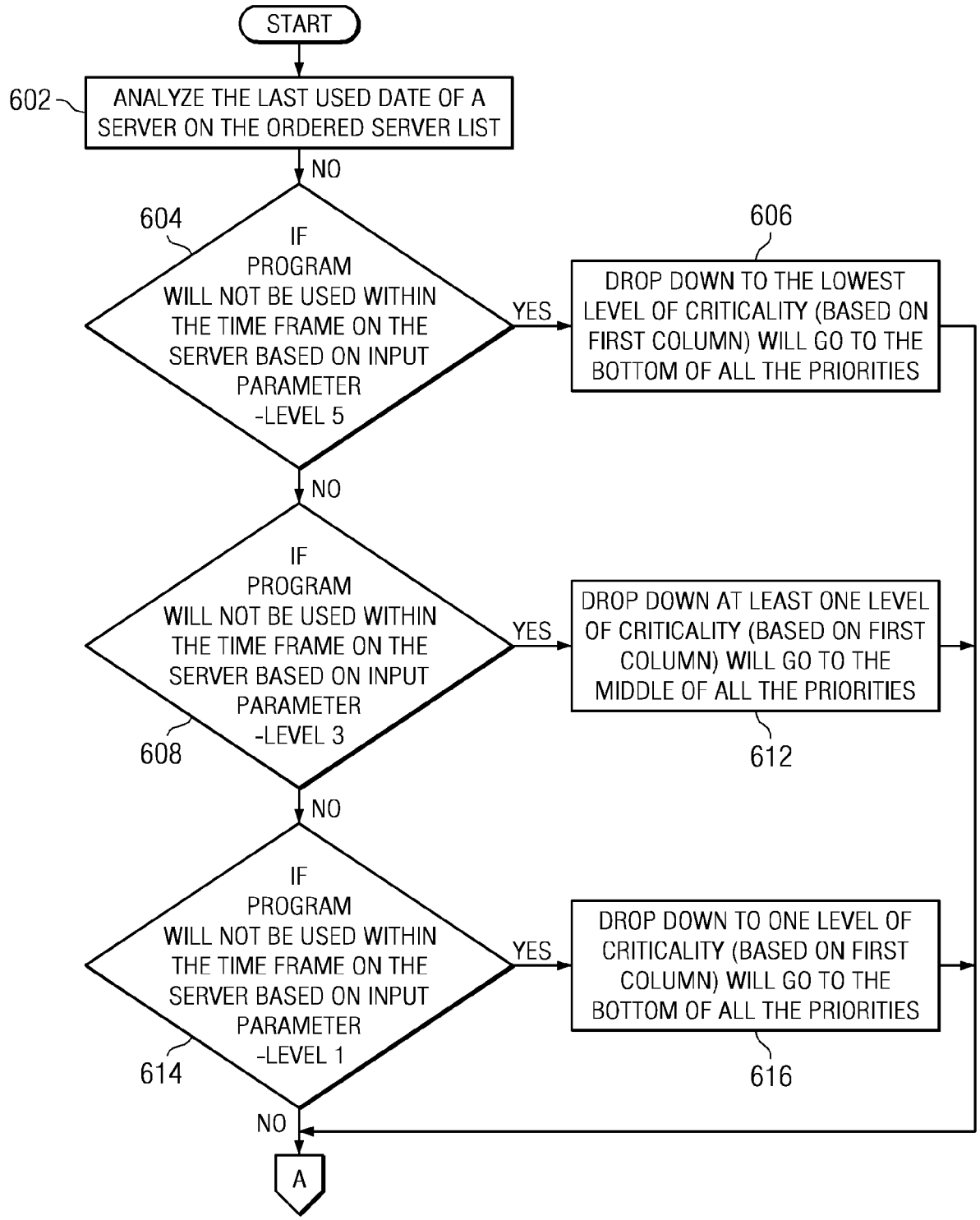
FIGS. 6A and 6B are a flowchart corresponding to another of the steps in the flowchart of FIG. 3.
Figure 6B:
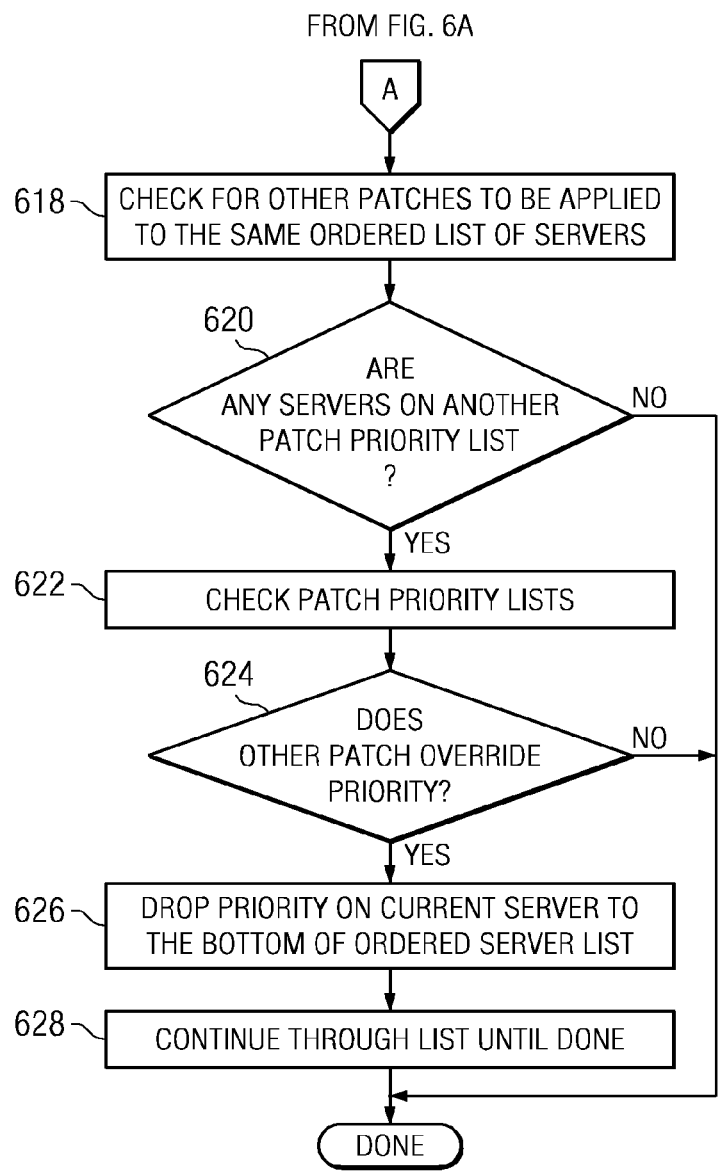

Referring to FIG. 6A, there is shown a flowchart wherein each identified server, in the ordered list of table 500 that is shown by FIG. 5D, is successively processed. At step 602, the last date that a particular server was used is considered. Step 604 queries whether the program of the particular server will or will not be used within a time frame, established by the last date of use and by an input parameter for the server, if the server has a level 5 priority value. For example, historical information collected for this particular server may show that the server program is only used every 90 days. Then, if the input parameter is selected to be 90 days and the time frame is 30 days, it can readily be determined if the server will or will not be used within the time frame.

If the result of step 604 is positive (i.e., the server program will not be used within the time frame and the server is at level 5 priority), the process is directed to step 606. This step drops the server to the lowest level of priority, or level 1, in column 504 of FIG. 5D.

If the result of step 604 is negative, the query of step 604 is substantially repeated at step 608, except that a priority level of 3 is considered. A positive result in this case, as shown at step 612, drops the server by one level of priority (which would be to level 1, if that was the only level that was below level 3). Otherwise, the process goes to step 614 and queries the server for a level of 1. A positive result at step 614 would cause the server to be assigned the lowest priority for installation of the patch. A negative result would move the process to step 618 of FIG. 6B.

At step 618, a search is made to see if any other patches are to be applied to identified servers on the ordered server list. Step 620 indicates that if there are no such patches, the process of FIGS. 6A and 6B ends. Otherwise, pertinent lists showing such other patches are checked at step 622. In accordance with step 624, the process ends if no other patch is found to override the priority of an identified server. On the other hand, as shown by step 626, if another patch does override the priority of an identified server, the server priority is dropped to the bottom priority of the ordered server list. Step 628 indicates that the procedure of steps 618-626 is carried out for each of the servers on the ordered server list. Thereafter, the procedure ends and the overall process moves to step 312 of FIG. 3.

In the process of installing a patch, servers of the same or other systems, may be grouped, clustered or bundled together. The patch would then be applied to each server of the cluster at the same time. Accordingly, step 312 is directed to creating or defining such clusters of servers, and applying the same priority for receiving the patch, as shown by the second sort order, to each server of a cluster.

Step 314 queries whether the business or other entity associated with network 102 has a hierarchy, or list, that specifies a priority for applying a particular type of patch to servers. If there is no such list or hierarchy, step 316 outputs a list, based on the second sort order, that indicates the order or priority for installing the patch in respective identified servers.

If there is a hierarchy or patch priority list for the entity, a table is ordered according to the priority at step 318, and the list or lists are outputted at step 320. If the list specifies servers that are to be clustered or bundled, the bundles are formed or defined at step 322. The patch is then installed on the servers of respective bundles, according to the priority specified in the list.

Figure 7:
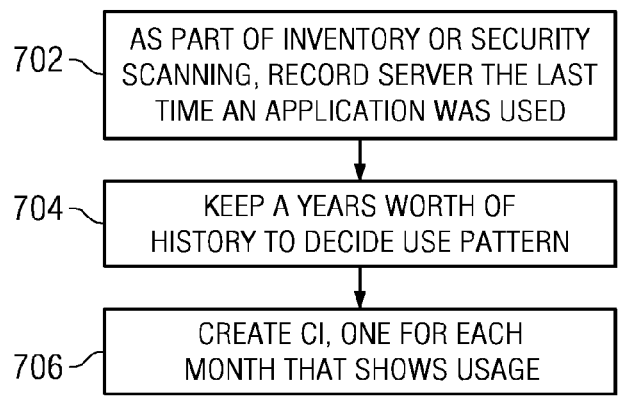
FIG. 7 is a flowchart associated with teachings of the flowchart of FIG. 6.

Configuration items are generally gathered during an inventory process, or assigned when an asset is added to the configuration database. Referring to FIG. 7, there is shown a task performed in support of step 310 of FIG. 3, that is, revising server usage based on past use. At step 702, as part of the inventory or security scanning activity, a record is made of the last time a server application was used. Step 704 indicates that a year's worth of history is stored, in order to provide a historical pattern of use for the server. In accordance with step 706, a configuration item can be created for each month that shows usage.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can store the program for use by or in connection with the instruction execution system, apparatus, or device.

The medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for installing a patch for a program that is included in servers, the method comprising the steps of:
    a computer identifying a plurality of the servers, wherein each one of the plurality of the servers requires an installation of the patch;
    the computer assigning two or more priority values to each one of the plurality of the servers, wherein each one of the two or more priority values is associated with a different one of a plurality of criterion;
    the computer assigning an importance level to each one of the plurality of criterion relative to other ones of the plurality of criterion, wherein the importance level is assigned according to a patch priority policy of a business;
    the computer, for a most important one of the plurality of criterion, sorting the plurality of the servers using one of the two or more priority values that is assigned to each one of the plurality of the servers and that is associated with the most one important one of the plurality of criterion to provide a first sort order;
    the computer determining a time when each one of the plurality of the servers last used the program;
    the computer receiving a time parameter, wherein the time parameter specifies a length of time;

the computer, for each one of the plurality of the servers, determining whether each one of the plurality of the servers last used the program during the length of time;

the computer revising the first sort order using a determination of whether each one of the plurality of the servers last used the program during the length of time to provide a second sort order, wherein the second sort order corresponds to a second most important one of the plurality of criterion; and the computer installing the patch on the plurality of the servers in the second sort order.

2. The method of claim 1, wherein the computer assigning the two or more priority values comprises the computer assigning, to a prespecified cluster of the plurality of the servers, a same priority value for one of the two or more priority values.

3. The method of claim 1, further comprising:
the computer continually acquiring and storing the time when each one of the plurality of the servers last used the program.

4. The method according to claim 1, wherein the computer identifying the plurality of the servers comprises the computer determining that the plurality of the servers include a specific version of the program and that the plurality of the servers are running a particular version of an operating system.

5. The method according to claim 1, wherein the patch priority policy defines a plurality of patch types and a weight assigned to each one of the plurality of patch types.

6. The method according to claim 1, further comprising:
the computer creating a table that includes a plurality of columns arranged sequentially from most important to least important, wherein each one of the plurality of columns is associated with only one of the plurality of criterion, and wherein the most important one of the plurality of criterion is associated with a most important one of the plurality of columns, and wherein a least important one of the plurality of criterion is associated with a least important one of the plurality of columns.

7. The method according to claim 6, further comprising:
the computer storing the one of the two or more priority values that is associated with the most important one of the plurality of criterion in the most important one of the plurality of columns.

8. A computer program product for installing a patch for a program that is included in servers, the computer program product comprising:

one or more computer-readable tangible storage devices;

program instructions, stored on at least one of the one or more storage devices, to identify a plurality of the servers, wherein each one of the plurality of the servers requires an installation of the patch;

program instructions, stored on at least one of the one or more storage devices, to assign two or more priority values to each one of the plurality of the servers, wherein each one of the two or more priority values is associated with a different one of a plurality of criterion;

program instructions, stored on at least one of the one or more storage devices, to assign an importance level to each one of the plurality of criterion relative to other ones of the plurality of criterion, wherein the importance level is assigned according to a patch priority policy of a business;

program instructions, stored on at least one of the one or more storage devices, for a most important one of the plurality of criterion, to sort the plurality of the servers using one of the two or more priority values that is assigned to each one of the plurality of the servers and that is associated with the most one important one of the plurality of criterion to provide a first sort order;

program instructions, stored on at least one of the one or more storage devices, to determine a time when each one of the plurality of the servers last used the program;

program instructions, stored on at least one of the one or more storage devices, to receive a time parameter, wherein the time parameter specifies a length of time;

program instructions, stored on at least one of the one or more storage devices, for each one of the plurality of the servers, to determine whether each one of the plurality of the servers last used the program during the length of time;

program instructions, stored on at least one of the one or more storage devices, to revise the first sort order using a determination of whether each one of the plurality of the servers last used the program during the length of time to provide a second sort order, wherein the second sort order corresponds to a second most important one of the plurality of criterion; and program instructions, stored on at least one of the one or more storage devices, to install the patch on the plurality of the servers in the second sort order.

9. The computer program product according to claim 8, wherein the program instructions to identify the plurality of the servers determine that the plurality of the servers include a specific version of the program and that the plurality of the servers are running a particular version of an operating system.

10. The computer program product according to claim 8, wherein the patch priority policy defines a plurality of patch types and a weight assigned to each one of the plurality of patch types.

11. The computer program product according to claim 8, further comprising:
program instructions, stored on at least one of the one or more storage devices, to create a table that includes a plurality of columns arranged sequentially from most important to least important, wherein each one of the plurality of columns is associated with only one of the plurality of criterion, and wherein the most important one of the plurality of criterion is associated with a most important one of the plurality of columns, and wherein a least important one of the plurality of criterion is associated with a least important one of the plurality of columns.

12. The computer program product according to claim 11, further comprising:
program instructions, stored on at least one of the one or more storage devices, to store the one of the two or more priority values that is associated with the most important one of the plurality of criterion in the most important one of the plurality of columns.

13. The computer program product of claim 8, wherein the program instructions to assign the two or more priority values assign, to a prespecified cluster of the plurality of the servers, a same priority value for one of the two or more priority values.

14. The computer program product of claim 8, further comprising:
program instructions, stored on at least one of the one or more storage devices, to continually acquire and store the time when each one of the plurality of the servers last used the program.

15. A computer system for installing a patch for a program that is included in servers, the computer system comprising:

one or more processors, one or more computer-readable memories and one or more computer-readable tangible storage devices;

program instructions, stored on at least one of the one or more storage devices for execution by at least one of the one or more processors via at least one of the one or more memories, to identify a plurality of the servers, wherein each one of the plurality of the servers requires an installation of the patch;

program instructions, stored on at least one of the one or more storage devices for execution by at least one of the one or more processors via at least one of the one or more memories, to assign two or more priority values to each one of the plurality of the servers, wherein each one of the two or more priority values is associated with a different one of a plurality of criterion;

program instructions, stored on at least one of the one or more storage devices for execution by at least one of the one or more processors via at least one of the one or more memories, to assign an importance level to each one of the plurality of criterion relative to other ones of the plurality of criterion, wherein the importance level is assigned according to a patch priority policy of a business;

program instructions, stored on at least one of the one or more storage devices for execution by at least one of the one or more processors via at least one of the one or more memories, for a most important one of the plurality of criterion, to sort the plurality of the servers using one of the two or more priority values that is assigned to each one of the plurality of the servers and that is associated with the most one important one of the plurality of criterion to provide a first sort order;

program instructions, stored on at least one of the one or more storage devices for execution by at least one of the one or more processors via at least one of the one or more memories, to determine a time when each one of the plurality of the servers last used the program;

program instructions, stored on at least one of the one or more storage devices for execution by at least one of the one or more processors via at least one of the one or more memories, to receive a time parameter, wherein the time parameter specifies a length of time;

program instructions, stored on at least one of the one or more storage devices for execution by at least one of the one or more processors via at least one of the one or more memories, for each one of the plurality of the servers, to determine whether each one of the plurality of the servers last used the program during the length of time;

program instructions, stored on at least one of the one or more storage devices for execution by at least one of the one or more processors via at least one of the one or more memories, to revise the first sort order using a determination of whether each one of the plurality of the servers last used the program during the length of time to provide a second sort order, wherein the second sort order corresponds to a second most important one of the plurality of criterion; and program instructions, stored on at least one of the one or more storage devices for execution by at least one of the one or more processors via at least one of the one or more memories, to install the patch on the plurality of the servers in the second sort order.

16. The computer system according to claim 15, wherein the patch priority policy defines a plurality of patch types and a weight assigned to each one of the plurality of patch types.

17. The computer system according to claim 15, further comprising:

program instructions, stored on at least one of the one or more storage devices for execution by at least one of the one or more processors via at least one of the one or more memories, to create a table that includes a plurality of columns arranged sequentially from most important to least important, wherein each one of the plurality of columns is associated with only one of the plurality of criterion, and wherein the most important one of the plurality of criterion is associated with a most important one of the plurality of columns, and wherein a least important one of the plurality of criterion is associated with a least important one of the plurality of columns.

18. The computer system according to claim 17, further comprising:

program instructions, stored on at least one of the one or more storage devices for execution by at least one of the one or more processors via at least one of the one or more memories, to store the one of the two or more priority values that is associated with the most important one of the plurality of criterion in the most important one of the plurality of columns.

19. The computer system of claim 15, wherein the program instructions to assign the two or more priority values assign, to a prespecified cluster of the plurality of the servers, a same priority value for one of the two or more priority values.

20. The computer system of claim 15, further comprising:

program instructions, stored on at least one of the one or more storage devices for execution by at least one of the one or more processors via at least one of the one or more memories, to continually acquire and store the time when each one of the plurality of the servers last used the program.

* * * * *